Patented Oct. 12, 1948

2,451,212

UNITED STATES PATENT OFFICE 2,451,212

THERMOPLASTIC COATING COMPOSITION

Leon J. Gold, Shorewood, Wis., assignor to Milprint, Inc., Milwaukee, Wis., a corporation of Delaware No Drawing. Application November 26, 1945, Serial No. 630,988

6 Claims. (Cl. 106—287)

The invention relates to coating compositions and more particularly to thermoplastic coatings.

The object of the invention is to provide a coating that has good properties of adhesion when applied to sheet material such as paper, glassine, regenerated cellulose, metal and metal foil, and which will form a strong weld when sealed by means of heat and pressure to either another similarly coated sheet material or even and especially noteworthy to an uncoated sheet material, such as paper, glassine, regenerated cellulose, and metal foil. Various compounds or compositions, such as polymerized vinyl acetate, ethyl cellulose, chlorinated rubber, vinyl chloride, have been used as coatings for the sheet materials above mentioned, but a strong bond is only obtained when both sides of the parts to be sealed are previously coated. On the other hand by the present invention the coating applied to one of the surfaces to be sealed can be sealed by heat and pressure to an uncoated surface. For example, paper coated with the composition can be sealed to uncoated metal with a resulting bond stronger than the paper. The coating of this invention also imparts excellent resistance of the material to most oils and greases.

This application is a continuation in part of my copending application Serial No. 514,676, filed December 17, 1943 (now abandoned).

The base material of the coating embodying the invention is a dimerized fatty acid that has been reacted with ethylene diamine to produce an ethylene diamine polymer of polymeric fatty acid or polyamide resin. One such form of resin made from soy bean oil developed by the United States Department of Agriculture is known as Norelac, and further details of this resin will be found in Abstract Service for 1944, page A–18–100, published by Interscience Publishing, Inc., New York city, and Plastics News Letter, September 11, 1944 (Plastic No. 345).

I have found that Norelac when properly combined with a suitable plasticizer and wax with or without the additions of an extender will provide a coating composition having the properties above mentioned.

A suitable formula is, as follows:

| | Parts |
|---|---|
| 50% solution of Norelac in butyl alcohol | 35 |
| Benzol | 13 |
| Plasticizer preferably a mixture of ortho and para toluene ethyl sulfonamides, one such plasticizer being known as Santicizer #8 made by Monsanto Chemical Company, of Chicago, Illinois | 2.5 |
| 10% solution paraffin wax in benzol | 6 |

The above formula is only an example, and the parts given by weight can be varied, as follows:

| | Range, percent |
|---|---|
| Norelac | 10 to 60 |
| Solvent | 5 to 90 |
| Plasticizer | 1 to 30 |
| Wax | 0 to 15 |

Other waxes may be used instead of paraffin, such as those known in the trade as microcrystalline waxes, as well as natural waxes such as beeswax, ozokerite, spermaceti, carnauba wax, and wax-like materials such as hydrogenated castor oil and metal stearates such as calcium or aluminum stearate, stearic acid. These waxes serve to remove surface tack and also increase the water and water-vapor transmission resistance of the coated material.

The butyl alcohol in the above formula may be replaced all or in part by isopropyl alcohol, amyl alcohol or octyl alcohol. The benzol may be replaced by toluol, xylol, gasoline, petroleum napthas, kerosene, or other liquid aromatic or aliphatic solvents.

Modifications of this formula may also be made by the addition of resinous materials such as those already mentioned as plasticizers and also ester gums (resins obtained by esterifying glycerol or glycols with rosin or hydrogenated rosin). These serve as extenders. Other high molecular weight compounds such as chlorinated rubber, ethyl cellulose, and nitrocellulose may be used with Norelac in order to extend and modify the physical properties of the coating. Where extenders such as the resinous material and high molecular weight compounds such as mentioned above are used, they may form from 0 to 30 percent by weight of the coating composition.

The following examples illustrate various modifications of the formula given above:

Example 1

| | Parts |
|---|---|
| Norelac | 90.0 |
| Plasticizer (Santicizer #8) | 16.5 |
| Paraffin (134° F.) | 3.0 |

The above is dissolved in a suitable quantity of solvent consisting of equal parts of butyl alcohol and xylol to make the coating composition, the quantity of the solvents being determined by the viscosity and solid concentration desired.

Example 2

| | Parts |
|---|---|
| Norelac | 90.00 |
| Plasticizer (Santicizer #8) | 17.00 |
| Hydrogenated rosin | 10.00 |
| Paraffin (134° F.) | 1.5 |

The hydrogenated rosin may be that sold by the Hercules Powder Company, of Wilmington, Delaware, under the name of Staybelite.

The above is dissolved as in the first example in a suitable quantity of solvent consisting of butyl alcohol and xylol to make the coating composition.

Example 3

| | Parts |
|---|---|
| Norelac | 75.00 |
| Plasticizer (Santicizer #8) | 19.00 |
| Ester gum | 15.00 |
| Paraffin (134° F.) | 3.00 |

The above is dissolved in a suitable quantity of solvent consisting of equal parts of butyl alcohol and xylol to make the coating composition.

Example 4

| | Parts |
|---|---|
| Norelac | 90.00 |
| Plasticizer (Santicizer #8) | 17.00 |
| Paraffin | 2.00 |

The above is dissolved in a suitable quantity of solvent consisting of equal parts of isopropyl alcohol and toluol to make the coating composition.

While in the specific examples given above equal quantities of alcohol solvent and hydrocarbon solvent have been mentioned as preferable, it is to be noted that the alcohol solvent is the active solvent and that the hydrocarbon solvents such as xylol, benzol, etc., are diluents, and that depending upon the concentration of the Norelac in the final product will depend the amount of active solvent necessary for the composition, and that therefore, the range of alcohol solvent to the hydrocarbon solvent may be for the alcohol from 10 to 100 per cent and for the hydrocarbon solvent from 0 to 90 per cent.

The above coating compositions may be applied to the entire surface of the sheet materials heretofore mentioned or to spots of the same desired to be sealed together and imparts exceptionally good adhesion thereto when the coated sheets or a coated sheet and uncoated sheet are heat-sealed together.

The specific compositions described in this specification are given as exemplificatory embodiments of the invention, and it is intended to include in the appended claims not only such specific compositions and their range of proportions but also any equivalents and variations within the scope of the disclosure.

What I claim as my invention is:

1. A thermoplastic coating composition comprising 10 to 60 per cent by weight of Norelac, 2.5 per cent to 30 per cent by weight of a plasticizer consisting of a mixture of ortho and para toluene ethyl sulfonamides, and .1 to 15 per cent by weight of paraffin, all dispersed in a volatile solvent.

2. A thermoplastic coating composition consisting of a plasticized mixture of Norelac and a plasticizer consisting of a mixture of ortho and para toluene ethyl sulphonamides consisting of from two and one-half to thirty per cent by weight of said plasticizer and the remainder Norelac.

3. A thermoplastic coating composition consisting of one part of a plasticized mixture of Norelac and a plasticizer consisting of a mixture of ortho and para toluene ethyl sulphonamides consisting of from two and one-half to thirty per cent by weight of said plasticizer and the remainder Norelac, and up to nine parts of a volatile solvent.

4. A thermoplastic coating composition consisting of one part of a plasticized mixture of Norelac and a plasticizer consisting of a mixture of ortho and para toluene ethyl sulphonamides consisting of from two and one-half to thirty per cent by weight of said plasticizer and the remainder Norelac, up to nine parts of a volatile solvent, and up to one and one-half parts of a wax.

5. A thermoplastic coating composition consisting of one part of a plasticized mixture of Norelac and a plasticizer consisting of a mixture of ortho and para toluene ethyl sulphonamides consisting of from two and one-half to thirty per cent by weight of said plasticizer and the remainder Norelac, up to nine parts of a volatile solvent, up to one and one-half parts of a wax and up to three parts of an extender of the group consisting of hydrogenated resin and ester gum.

6. A thermoplastic coating composition consisting of one part of a plasticized mixture of Norelac and a plasticizer consisting of a mixture of ortho and para toluene ethyl sulphonamides consisting of from two and one-half to thirty per cent by weight of said plasticizer and the remainder Norelac, up to nine parts of a volatile solvent, and up to three parts of an extender of the group consisting of hydrogenated rosin and ester gum.

LEON J. GOLD.

REFERENCES CITED

The following references are of record in the file of this patent:

UNITED STATES PATENTS

| Number | Name | Date |
|---|---|---|
| 1,826,699 | Charch et al. | Oct. 6, 1931 |
| 2,042,589 | Charch et al. | June 2, 1936 |
| 2,102,207 | Hunt et al. | Dec. 14, 1937 |
| 2,108,810 | Finzel et al. | Feb. 22, 1938 |
| 2,141,575 | Warp | Dec. 27, 1938 |
| 2,249,686 | Dykstra | July 15, 1941 |
| 2,350,366 | Mitchell | June 6, 1944 |
| 2,354,574 | Carson | July 25, 1944 |

OTHER REFERENCES

"Oil and Soap" 21 (1944), pp. 101-107.